(12) United States Patent
Hanaoka

(10) Patent No.: US 7,079,821 B2
(45) Date of Patent: Jul. 18, 2006

(54) SIGNAL CORRECTION METHOD AND RECEIVER

(75) Inventor: Hiromichi Hanaoka, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 429 days.

(21) Appl. No.: 10/206,348

(22) Filed: Jul. 29, 2002

(65) Prior Publication Data

US 2003/0027536 A1 Feb. 6, 2003

(30) Foreign Application Priority Data

Jul. 31, 2001 (JP) ............................. 2001-232467

(51) Int. Cl.
$H04B\ 1/02$ (2006.01)
(52) U.S. Cl. .................. 455/147; 455/101; 455/230
(58) Field of Classification Search ................ 455/147, 455/151.2, 196.1, 208, 255, 258, 259, 316, 455/230, 101; 340/5.2, 5.72, 426.13, 426.18, 340/426.36; 307/10.1, 10.2
See application file for complete search history.

(56) References Cited

U.S. PATENT DOCUMENTS

| | | | | |
|---|---|---|---|---|
| 4,605,922 A | * | 8/1986 | Blattman et al. ........... 340/552 |
| 4,881,148 A | * | 11/1989 | Lambropoulos et al. .... 361/172 |
| 5,616,966 A | * | 4/1997 | Fischer et al. ............. 307/10.5 |
| 5,889,471 A | * | 3/1999 | Glehr et al. ............... 340/5.63 |
| 5,973,759 A | * | 10/1999 | Itoh et al. ..................... 349/5 |
| 6,026,278 A | * | 2/2000 | Suzuki ...................... 340/7.34 |
| 6,335,576 B1 | * | 1/2002 | Wallace ..................... 307/10.2 |
| 2002/0199133 A1 | * | 12/2002 | Marino et al. ................ 714/15 |
| 2003/0185326 A1 | * | 10/2003 | Kolze ......................... 375/371 |

FOREIGN PATENT DOCUMENTS

| | | |
|---|---|---|
| EP | 0 805 574 A1 | 11/1997 |
| JP | 5-37508 | 2/1993 |
| JP | 7-142961 | 6/1995 |
| JP | 10-276110 | 10/1998 |

* cited by examiner

Primary Examiner—Sonny Trinh
(74) Attorney, Agent, or Firm—Sughrue Mion, PLLC

(57) ABSTRACT

A signal correction method and receiver receives an asynchronous wireless signal including a code signal, and determines whether the code signal is discriminated as a regular code. When the determined code signal is not discriminated as the regular code, the signal correction method and receiver changes a sampling time for the asynchronous wireless signal within a predetermined range on sampling. When the code signal is still not discriminated as the regular code after changing the sampling time, the signal correction method and receiver changes a tuning frequency of a local oscillation signal.

8 Claims, 5 Drawing Sheets

IN NORMAL TIMES

IN ABNORMAL TIMES

SIGNAL CORRECTION METHOD AND RECEIVER

BACKGROUND OF THE INVENTION

This invention relates to a signal correction method for use in receiving an asynchronous wireless signal intended for correcting a sampling time and variations in a tuning frequency, which are required at the time of receiving a wireless signal transmitted from a sending end, as well as to a receiver.

For example, when ID data are verified between a communications unit (hereinafter called a "portable unit") carried by a driver and another communications unit (hereinafter called a "stationary unit") installed on a vehicle, an immobilizer employed for preventing the theft of a vehicle permits unlocking of a door lock or activation of an ignition switch.

In relation to such an immobilizer, when changes have arisen in an ambient temperature or when a distance between the portable unit and the stationary unit has become longer, a communication error sometimes arises between the units. In such a case, the units fail to verify ID data, raising a problem of inability to unlock a door lock.

In order to solve such a problem, as described in, e.g., JP-A-10-276110 (hereinafter called a "related-art example 1"), there has been proposed and put into practice a method of monitoring an ambient temperature and changing a tuning frequency by adjusting the capacitance of a varicap diode when the ambient temperature has reached a specified temperature, to thereby correct a tuning frequency drift stemming from temperature changes.

As described in, e.g., JP-A-5-37508 (hereinafter called a "related-art example 2"), there has been proposed another method of correcting a tuning frequency drift, by sampling a received signal through division of received data bits into sixteen equal parts.

However, according to the method described in the related-art example 1, correction of a tuning frequency is limited to correction of a drift stemming from temperature changes. Hence, the method yields no effect for sensitivity failures with respect to changes in pulse width stemming from the influence of the surrounding environment.

The method described in the related-art example 2 yields a problem of inability to effect highly-precise follow-up frequency correction if the allowable limit of pulse width encompasses a wide range.

SUMMARY OF THE INVENTION

It is therefore an object of the present invention to provide a signal correction method and a receiver, which enable high-precision receipt of a code signal involving a tuning frequency drift.

In order to achieve the above object, according to the present invention, there is provided a signal correction method comprising the steps of:
(a) receiving an asynchronous wireless signal including a code signal;
(b) determining whether the code signal is discriminated as a regular code; and
(c) changing a sampling time for the asynchronous wireless signal within a predetermined range on sampling when the code signal is not discriminated as the regular code in the step (b).

Preferably, the correction method further comprising the steps of:
(d) determining whether the code signal is discriminated as the regular code after the step (c) is performed; and
(e) changing a tuning frequency of a local oscillation signal when the code signal is still not discriminated as the regular code in the step (d).

According to the present invention, there is also provided a signal correction method, comprising the steps of:
(a) receiving an asynchronous wireless signal including a code signal;
(b) determining whether the code signal is discriminated as a regular code; and
(c) changing a tuning frequency of a local oscillation signal when the code signal is not discriminated as the regular code in the step (b).

Preferably, the signal correction method further comprising the steps of:
(d) determining whether the code signal is discriminated as the regular code after the step (c) is performed; and
(e) changing a sampling time for the asynchronous wireless signal within a predetermined range on sampling when the code signal is still not discriminated as the regular code in the step (d).

According to the present invention, there is also provided an receiver, comprising:
a front-end circuit, which received an asynchronous wireless signal, and converts the asynchronous wireless signal into an intermediate frequency signal by multiplying the asynchronous wireless signal with a local oscillation signal;
a code signal reader, which reads a code signal from the intermediate frequency signal output from the front-end circuit; and
a controller, determining whether the code signal is discriminated as a regular code, and changing a sampling time for the asynchronous wireless signal within a predetermined range on the front-end circuit when the code signal is not discriminated as the regular code.

Preferably, the controller changes a tuning frequency of the local oscillation signal on the front-end circuit when the code signal corrected by changing of the sampling time is still not discriminated as the regular code.

According to the present invention, there is also provided an receiver, comprising:
a front-end circuit, which receives an asynchronous wireless signal, and converts the asynchronous wireless signal into an intermediate frequency signal by multiplying the asynchronous wireless signal with a local oscillation signal;
a code signal reader, which reads a code signal from the intermediate frequency signal output from the front-end circuit; and
a controller, determining whether the code signal is discriminated as a regular code, and changing a tuning frequency of the local oscillation signal on the front-end circuit when the code signal is not discriminated as the regular code.

Preferably, the controller changes a sampling time for the asynchronous wireless signal within a predetermined range on the front-end circuit when the code signal corrected by changing of the tuning frequency of the local oscillation signal is still not discriminated as the regular code.

In the configurations and methods, when a code signal included in a received asynchronous wireless signal is discriminated as a regular code signal, a sampling time is adjusted within a predetermined range. A determination is again made as to whether the code signal is discriminated as the regular code. When the code signal is not discriminated as the regular code, the tuning frequency of the local oscillation signal is changed within a predetermined range, thereby again determining whether the code signal is discriminated as the regular code. When the code signal is not discriminated as the regular code in consequence, the code signal is determined to be a mismatch, thereby rendering the receiver inactive.

Accordingly, even when a distance between a transmitter and a receiver has become longer, communication can be established, thereby enabling functional improvement. Since components for improving communication sensitivity are obviated, the number of components can be curtailed, thereby enabling cost cutting and space savings. Moreover, variations in pulse width due to variations in components can be corrected by primarily software. Hence, system redundancy can be ensured.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
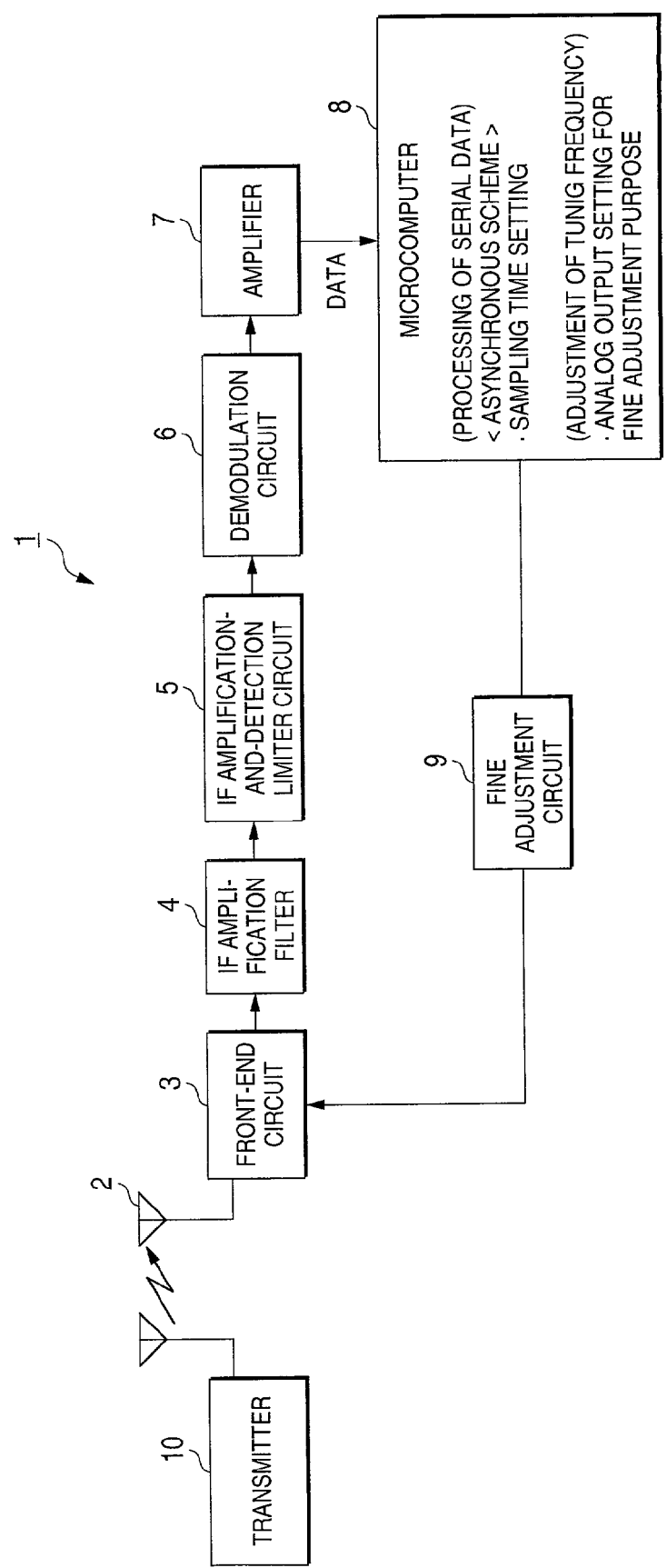
FIG. 1 is a block diagram showing the configuration of an asynchronous wireless signal receiver according to an embodiment of the invention.

A one embodiment of the invention will be described below by reference to the accompanying drawings. FIG. 1 is a block diagram showing the configuration of an asynchronous wireless signal receiver according to an embodiment of the invention. As illustrated, a receiver 1 includes an antenna 2 for receiving a signal transmitted from a transmitter 10, a front-end circuit 3 which converts a high frequency (RF) signal received by the antenna 2 into an Intermediate Frequency signal (hereinafter called a "IF signal"), by multiplying the high frequency signal with a local oscillation signal (a local signal), an IF amplification filter 4 which extracts a signal of desired frequency band from the IF signal output from the front-end circuit 3, an IF amplification-and-detection limiter circuit 5 for detecting an IF signal output from the IF amplification filter 4, a demodulation circuit 6 which demodulates a detected IF signal and extracts a code signal, and an amplifier 7.

A code signal reader is constituted of the IF amplification filter 4, the IF amplification-and-detection limiter circuit 5, the demodulation circuit 6, and the amplifier 7.

Also, the receiver 1 includes a microcomputer (control unit) 8 for changing a sampling time or a tuning frequency of a local oscillation signal in accordance with a determination which is made as to whether or not the code signal output from the amplifier 7 is a regular code signal, and a fine adjustment circuit 9 for changing a sampling time of the front-end circuit 3 or the tuning frequency of the local oscillation signal. If the code signal is determined not to be a regular code signal in the determination, the microcomputer 8 changes a sampling time or a tuning frequency of a local oscillation signal.

Figure 2:
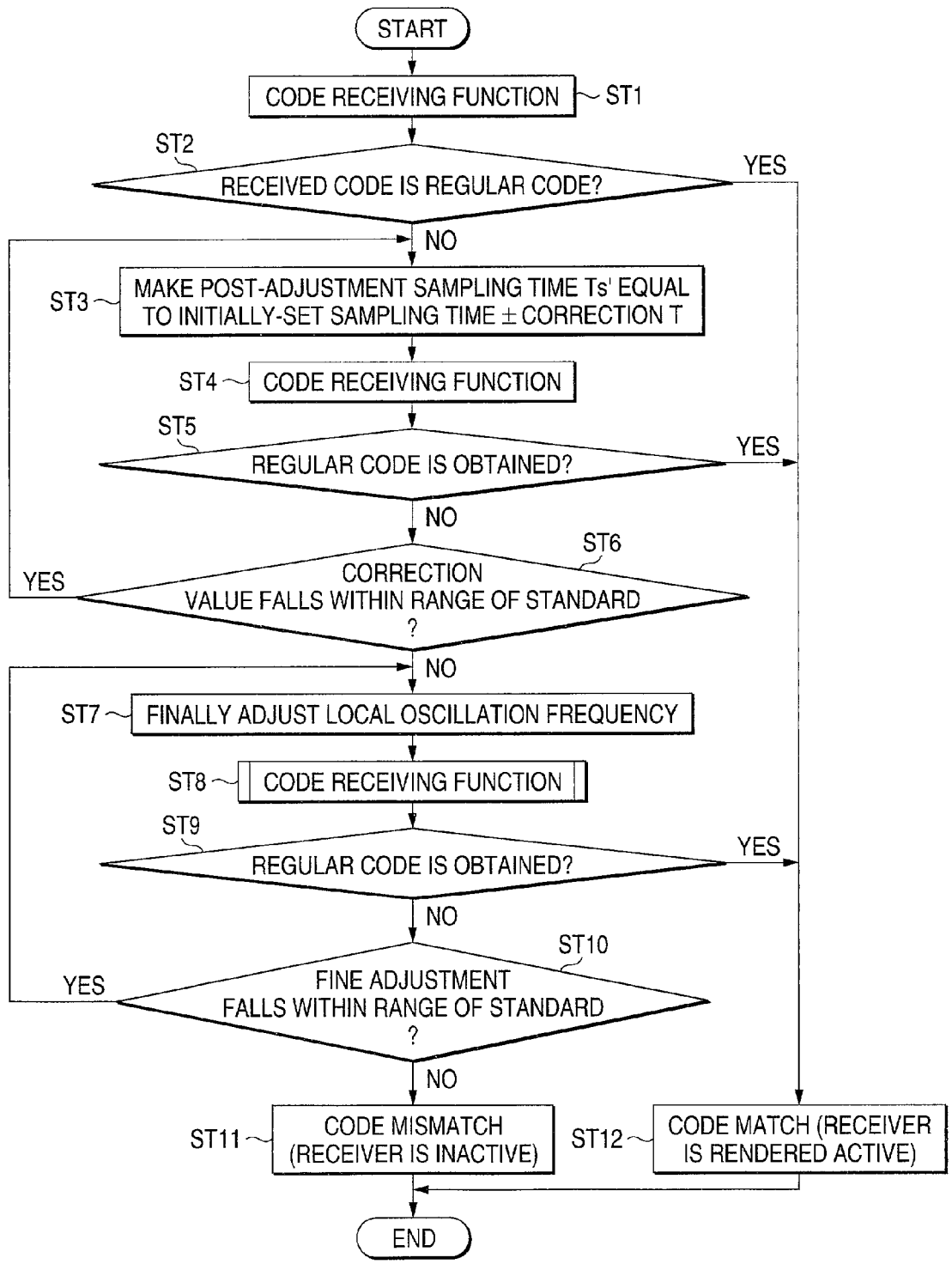
FIG. 2 is a flowchart showing procedures for processing the asynchronous wireless signal receiver of the embodiment.
Figure 3:
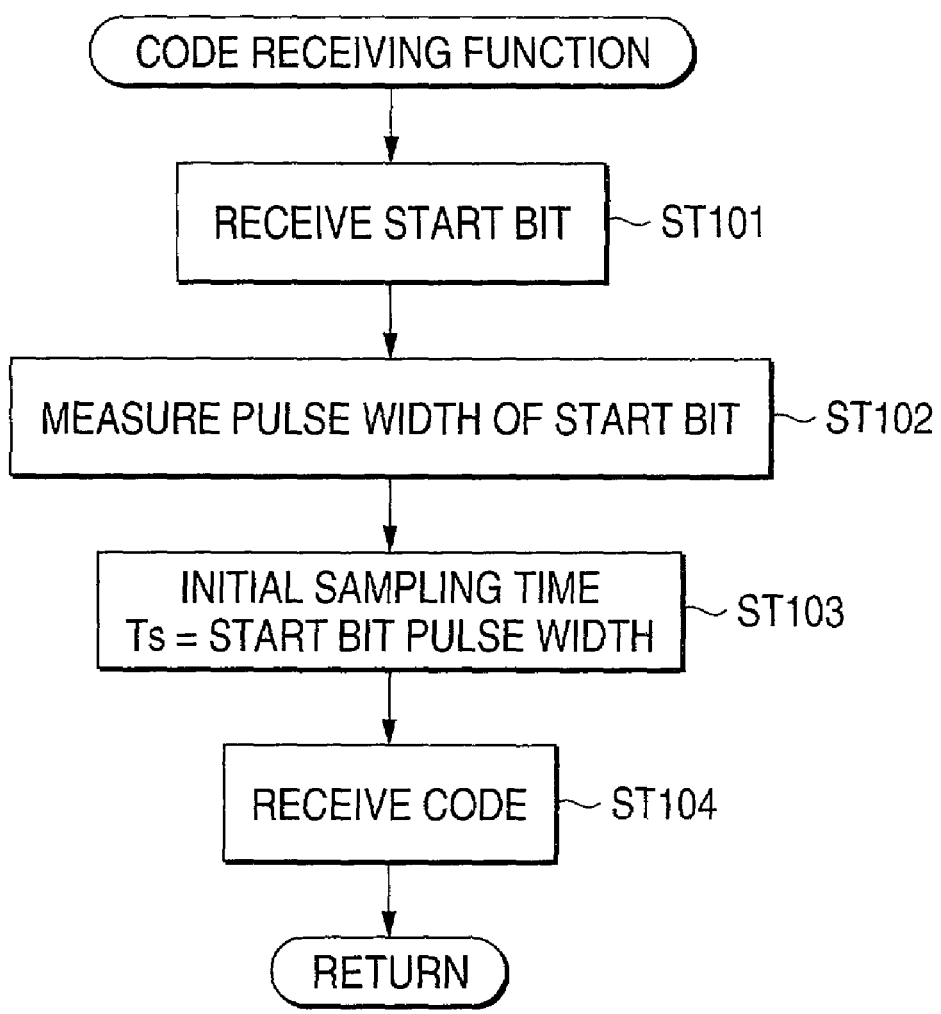
FIG. 3 is a flowchart specifically showing processing pertaining to a code signal receiving function in the flowchart shown in FIG. 2.

FIG. 2 is a flowchart showing operation of the receiver 1 of the embodiment. FIG. 3 is a flowchart showing procedures for processing a code signal receiving function shown in FIG. 2. Operation of the receiver 1 of the embodiment will be described by reference to the flowcharts. First, when a signal including a code signal is transferred by the transmitter 10 shown in FIG. 1, the transmitted signal is input into the front-end circuit 3 by way of the antenna 2.

The front-end circuit 3 converts the received RF signal into an IF signal by multiplying the RF signal with a local oscillation signal. The IF amplification filter 4 extracts a frequency component of desired band from the IF signal. Subsequently, the IF amplification-and-detection limiter circuit 5 detects the IF signal. The demodulation circuit 6 extracts the code signal from the IF signal. The extracted code signal is supplied to the microcomputer 8 after having been amplified by the amplifier 7.

Figure 4A:
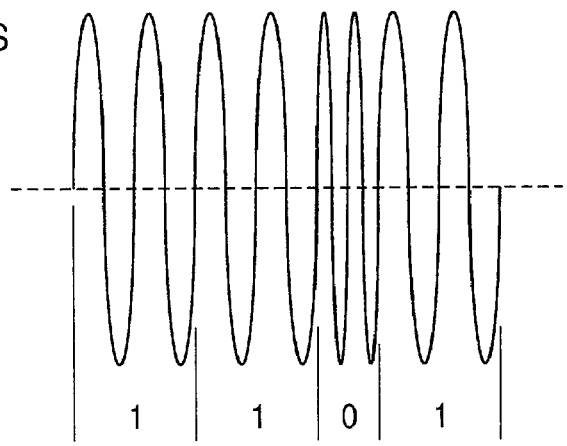
FIG. 4A is a descriptive view showing the waveform of a received asynchronous wireless signal when the code signal is not discriminated as the regular code.

The microcomputer 8 receives a start bit from the given code signal (in step ST1 shown in FIG. 2 and step ST101 shown in FIG. 3). For example, as shown in FIG. 4A, the microcomputer 8 receives high four data sets. Next, the width of a start bit is determined (in step ST102). At this time, a sampling time Ts (initial sampling time) is set as a start bit pulse width (step ST103). Subsequently, a code signal included in the IF signal is received (step ST104).

Figure 4B:
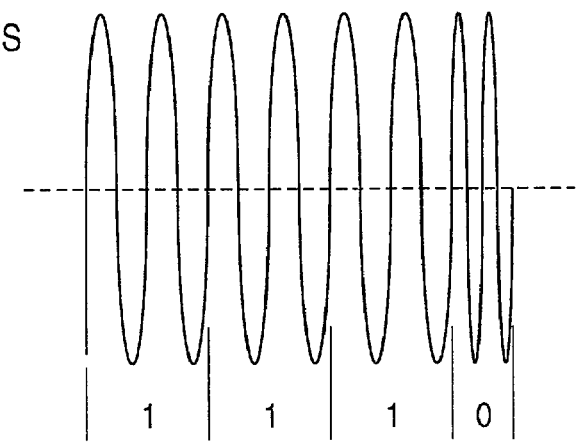
FIG. 4B is a descriptive view showing the waveform of a received asynchronous wireless signal when the code signal is discriminated as the regular code.
Figure 5:
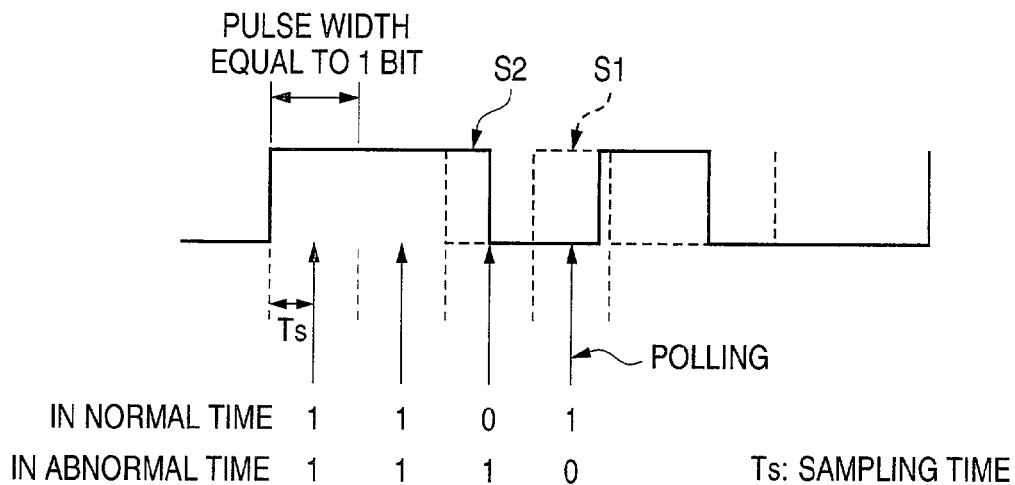
FIG. 5 is a descriptive view showing a code signal received during the period of an initially-set sampling time.

A determination is made as to whether or not the code signal is a regular code signal (step ST2 shown in FIG. 2). As shown in FIG. 4A, when a regular start bit code signal "1101" is obtained, a baseband signal is acquired, as designated by reference symbol S1 (the portion designated by dotted lines) shown in FIG. 5. In contrast, when an unauthorized code signal "1110" is received as shown in FIG. 4B, there is obtained a baseband signal, as designated by reference numeral S2 (the portion designated by solid lines) shown in FIG. 5.

If the regular code signal is received (when YES is selected in step ST2), the code signal is determined to be matched. Hence, the receiver 1 is brought into an active state (step ST12). In contrast, if the regular code signal is not received (when NO is selected in step ST2), a value formed by adding a predetermined correction value T to the sampling time Ts is set as a post-adjustment sampling time Ts (step ST3), and the value is again subjected to processing shown in FIG. 3 (step ST3).

Next, a determination is made as to whether or not the code signal obtained by sampling at the sampling time Ts' is a regular code signal (step ST5). If the code signal is determined to be a regular code signal, the code signal is determined to be matched, thereby rendering the receiver 1 active (step ST12).

Figure 6:
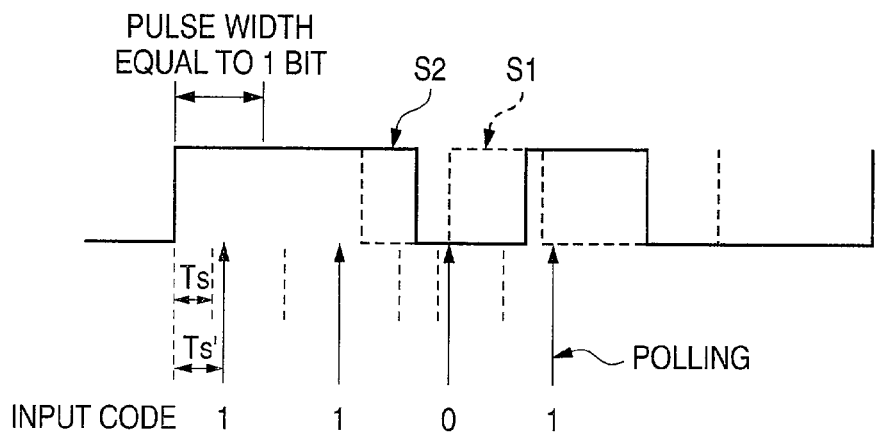
FIG. 6 is a descriptive view showing a code signal received during the period of a corrected sampling time.

As shown in FIG. 6, if the sampling time Ts is changed to another sampling time Ts' subsequent to adjustment, the regular code signal "1101" can be extracted from the baseband signal S2 that has been determined to be unauthorized (i.e., the area designated by the solid lines).

In contrast, if the regular code signal cannot be obtained (when NO is selected in step ST5), the sampling time is adjusted sequentially through use of a correction time T which falls within the range of a predetermined standard value. If the regular code signal cannot be obtained by use of the correction value T that falls within the range of a standard value (when NO is selected in step ST6), a local oscillation frequency of a local oscillator of the front-end circuit 3 (step ST7) is finely adjusted. There is again performed processing shown in FIG. 3 (step ST8). Consequently, when a regular code signal can be received (when YES is selected in step ST9), there is performed processing for rendering the receiver 1 active (step ST12).

When the regular code signal cannot be obtained (when NO is selected in step ST9), a local oscillation frequency is finely adjusted within a predetermined range. If the regular code signal can be obtained, processing proceeds to step S12 in the same manner as mentioned previously. In contrast, if the regular code signal cannot be obtained as a result of fine adjustment of a local oscillation frequency (when NO is selected in step ST10), the code signal is determined to be mismatched, thereby rendering the receiver 1 inactive (step ST11). In this way, a determination is made as to whether or not a regular code signal is obtained through adjustment of a sampling time and adjustment of a local oscillation frequency. On the basis of the result of determination, the receiver 1 is switched between an active state and an inactive state.

In this way, when the code signal obtained during the period of the initially-set sampling time Ts is not a regular code signal, the asynchronous wireless signal receiver 1 of the embodiment does not determine the code signal as simply a code signal mismatch, rather, the receiver 1 adjusts the sampling time Ts within a predetermined range. If a regular code signal cannot be obtained even in such a case, a local oscillation frequency is finely adjusted within a predetermined range, thereby obtaining a code signal.

Incidentally, it is possible to exchange an order of the sampling time correction in steps ST 3 to ST 6 and the local oscillation frequency adjustment in steps ST 7 to ST 10 shown in FIG. 2

Accordingly, the receiving sensitivity of an asynchronous wireless signal can be improved remarkably.

Although the correction method for use in receiving an asynchronous wireless signal and the receiver for receiving an asynchronous wireless signal according to the invention have been described by reference to the illustrated embodiment, the invention is not limited thereto. The configuration of individual sections can be replaced with an arbitrary configuration having the same function.

What is claimed is:

1. A signal correction method, comprising the steps of:
   (a) receiving an asynchronous wireless signal including a code signal;
   (b) determining whether the code signal is discriminated as a regular code; and
   (c) changing a sampling time for the asynchronous wireless signal within a predetermined range on sampling when the code signal is not discriminated as the regular code in the step (b),
   wherein the changing of the sampling time for the asynchronous wireless signal is performed without changing a tuning frequency of a local oscillation signal.

2. The correction method as set forth in claim 1, further comprising the steps of:
   (d) determining whether the code signal is discriminated as the regular code after the step (c) is performed; and
   (e) changing a tuning frequency of a local oscillation signal when the code signal is still not discriminated as the regular code in the step (d).

3. The correction method as set forth in claim 2, wherein, when the step (c) is performed, the tuning frequency of the local oscillation signal is not changed.

4. A signal correction method, comprising the steps of:
   (a) receiving an asynchronous wireless signal including a code signal;
   (b) determining whether the code signal is discriminated as a regular code;
   (c) changing a tuning frequency of a local oscillation signal when the code signal is not discriminated as the regular code in the step (b);
   (d) determining whether the code signal is discriminated as the regular code after the step (c) is performed; and
   (e) changing a sampling time for the asynchronous wireless signal within a predetermined range on sampling when the code signal is still not discriminated as the regular code in the step (d),
   wherein the changing of the sampling time for the asynchronous wireless signal is performed without changing the tuning frequency of the local oscillation signal.

5. A receiver;, comprising:
   a front-end circuit, which receives an asynchronous wireless signal, and converts the asynchronous wireless signal into an intermediate frequency signal by multiplying the asynchronous wireless signal with a local oscillation signal;
   a code signal reader, which reads a code signal from the intermediate frequency signal output from the front-end circuit; and
   a controller, determining whether the code signal is discriminated as a regular code, and changing a sampling time for the asynchronous wireless signal within a predetermined range on the front-aid circuit when the code signal is not discriminated as the regular code,
   wherein the controller changes the sampling time for the asynchronous wireless signal without changing a tuning frequency of the local oscillation signal.

6. The receiver as set forth in claim 5, wherein the controller changes a tuning frequency of the local oscillation signal on the front-end circuit when the code signal corrected by changing of the sampling time is still not discriminated as the regular code.

7. The receiver as set forth in claim 6, wherein, when the controller changes the sampling time for the asynchronous wireless signal, the controller does not change the tuning frequency of the local oscillation signal.

8. A receiver, comprising:
   a front-end circuit, which receives an asynchronous wireless signal, and converts the asynchronous wireless signal into an intermediate frequency signal by multiplying the asynchronous wireless signal with a local oscillation signal;
   a code signal reader, which reads a code signal from the intermediate frequency signal output from the front-end circuit; and
   a controller, determining whether the code signal is discriminated as a regular code, and changing a tuning frequency of the local oscillation signal on the front-end circuit when the code signal is not discriminated as the regular code
   wherein the controller changes a sampling time for the asynchronous wireless signal within a predetermined range on the front-end circuit when the code signal corrected by changing of the tuning frequency of the local oscillation signal is still not discriminated as the regular code,
   wherein, when the controller changes the sampling time for the asynchronous wireless signal, the controller does not change the tuning frequency of the local oscillation signal.

* * * * *